UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

METHOD OF PRODUCING ORGANIC ACIDS.

1,396,010.  Specification of Letters Patent.  Patented Nov. 8, 1921.

No Drawing. Original application filed October 22, 1917, Serial No. 197,886. Divided and this application filed January 29, 1919. Serial No. 273,781.

*To all whom it may concern:*

Be it known that I, ARTHUR A. BACKHAUS, of Baltimore, in the State of Maryland, have invented a certain new and useful Improvement in Methods for Producing Organic Acids, and do hereby declare that the following is a full, clear, and exact description thereof.

My invention relates particularly to a process of producing acids from materials of various kinds, but it has application especially to the production of acids from waste materials, as for example distillery waste or slop such as obtained from the distillation of alcohol.

The object of my invention is especially to utilize the waste obtained from the distillation of various materials used in the production of ethyl alcohol.

More particularly, the object of my invention is to make use of waste materials obtained in the production of ethyl alcohol from molasses, which may, for example, be obtained in the manufacture of cane or beet sugar or from potatoes or grain, such as wheat, rye, barley, corn, etc.

An object of my invention is, furthermore, to obtain oxalic acid, as well as volatile organic acids.

An object of my invention is, in addition, to provide a process of this character whereby the quantity of acids may be increased by the addition of catalysts.

A further object is to bring about the production of such acids more quickly and at lower temperatures than would be possible without the presence of the catalysts.

Still another object of my invention is to make use of metallic oxids such as catalysts.

Further objects of my invention will appear from the detailed description thereof contained hereinafter.

While my invention is capable of embodiment in many different forms, for the purpose of illustration I shall describe only certain forms of my invention hereinafter.

For example, I may proceed as follows: A quantity of the distillery waste or slop, having had the alcohol removed therefrom, is evaporated in the usual way to form a magma, which may have a density of 25° Bé. or higher. This may be mixed in the proportion of twenty-five parts by weight of magma to eight parts by weight of a caustic alkali, as for example caustic soda and one part of the catalyst, which may be ferric oxid ($Fe_2O_3$), manganese dioxid ($MnO_2$), or cerium oxid ($Ce_2O_3$). The mixing is continued until the alkali has become completely dissolved. The mixture is thereupon heated to a temperature of from 160° to 250° C. for from 4 to 20 hours. Where the temperature is low, the treatment is for a longer period of time than where the temperature is higher. The effect of the heating in the presence of the catalyst is to bring about the production of oxalic acid, as well as volatile organic acids, in larger quantity and at a lower temperature, as well as more quickly, than would be the case if the catalyst were absent.

The oxalic acid and volatile organic acids may be recovered and separated in any suitable manner. However, by way of example, I may proceed to recover and separate the same in accordance with the processes set forth in the applications of:

Arthur A. Backhaus and Carl Haner, Jr., for process of treating distillery waste, Serial No. 203,351, filed November 22, 1917.

Arthur A. Backhaus and Carl Haner, Jr., for method of treating distillery waste, Serial No. 197,885, filed October 22, 1917.

Carl Haner, Jr., for process of treating distillery waste, Serial No. 197,887, filed October 22, 1917.

Arthur A. Backhaus, for process of treating distillery waste, Serial No. 197,884, filed October 22, 1917.

Dezso E. Kelen, for process of refining oxalic acid, Serial No. 197,848, filed October 22, 1917.

This is a divisional application of my copending application upon process of producing organic acids, Serial No. 197,886, filed October 22, 1917.

While I have described my invention above in detail, I wish it to be understood that many changes may be made therein without departing from the spirit thereof.

Claims:

1. The process which comprises producing salts of organic acids by heating a mixture of distillery slop and a caustic alkali in the presence of cerium oxid, at a temperature of from 160° to 250° C.

2. The process which comprises producing oxalates by heating a mixture of concentrated distillery slop with a caustic alkali and cerium oxid, at a temperature of from 160° to 250° C.

3. The process which comprises producing oxalates by heating a mixture of concentrated distillery slop with caustic soda and cerium oxid at a temperature of from 160° to 250° C.

4. The process which comprises producing oxalates by heating a magma of about 24 parts distillery waste with about 8 parts sodium hydroxid and about 1 part cerium oxid at a temperature of about 160 to 250 degrees for about 4 to 20 hours.

In testimony that I claim the foregoing I have hereunto set my hand.

ARTHUR A. BACKHAUS.

Witnesses:
WILLIAM WATSON,
LEON DAVID.